(12) United States Patent
Bonner et al.

(10) Patent No.: US 10,787,316 B2
(45) Date of Patent: Sep. 29, 2020

(54) STOCKING ASSISTANT ROBOT

(71) Applicant: Sunrise R&D Holdings, LLC, Cincinnati, OH (US)

(72) Inventors: Brett Bracewell Bonner, New Richmond, OH (US); Dion Perkins, Cincinnati, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 56 days.

(21) Appl. No.: 16/018,215

(22) Filed: Jun. 26, 2018

(65) Prior Publication Data

US 2019/0389657 A1 Dec. 26, 2019

(51) Int. Cl.
| | |
|---|---|
| G05B 19/418 | (2006.01) |
| B65G 1/137 | (2006.01) |
| B65G 1/04 | (2006.01) |
| B66F 9/06 | (2006.01) |

(52) U.S. Cl.
CPC ......... *B65G 1/1373* (2013.01); *B65G 1/0492* (2013.01); *B66F 9/063* (2013.01); *G05B 19/41895* (2013.01); *B65G 2201/02* (2013.01); *B65G 2203/0216* (2013.01); *B65G 2203/044* (2013.01); *G05D 2201/0216* (2013.01)

(58) Field of Classification Search
CPC .............................................. G05B 19/41895
See application file for complete search history.

(56) References Cited

U.S. PATENT DOCUMENTS

| | | | | |
|---|---|---|---|---|
| 4,690,606 A | * | 9/1987 | Ross | B66F 7/065 414/495 |
| 9,120,622 B1 | | 9/2015 | Elazary et al. | |
| 9,786,187 B1 | * | 10/2017 | Bar-Zeev | G06Q 10/08355 |
| 9,827,683 B1 | * | 11/2017 | Hance | G06Q 10/0875 |

(Continued)

FOREIGN PATENT DOCUMENTS

| | | |
|---|---|---|
| CN | 206502557 U | 9/2017 |
| CN | 107471195 A | 12/2017 |

(Continued)

OTHER PUBLICATIONS

International Search Report for PCT/US2019/038977 dated Sep. 23, 2019.

(Continued)

*Primary Examiner* — Thomas Randazzo
(74) *Attorney, Agent, or Firm* — Dinsmore & Shohl LLP

(57) ABSTRACT

A stocking assistant robot includes a base plate, one or more wheels coupled to the base plate, a first support coupled to the base plate, and a second support coupled to the base plate, wherein the first support is configured to move perpendicular to the base plate and the second support is configured to move perpendicular to the base plate. The stocking assistant robot also includes a first actuator configured to move the first support perpendicular to the base plate, and a second actuator configured to move the second support perpendicular to the base plate. The stocking assistant robot identifies an item, determines a stock location based on the identified item, operates one or more electric motors coupled to the one or more wheels based on the stock location, and moves the first support or the second support perpendicular to the base plate based on the stock location.

16 Claims, 9 Drawing Sheets

(56) References Cited

U.S. PATENT DOCUMENTS

| | | | |
|---|---|---|---|
| 10,343,881 B2* | 7/2019 | Guo | B25J 5/007 |
| 2014/0224559 A1* | 8/2014 | Salek | B66F 9/063 |
| | | | 180/168 |
| 2015/0032252 A1* | 1/2015 | Galluzzo | B25J 15/0608 |
| | | | 700/218 |
| 2017/0066592 A1 | 3/2017 | Bastian, II et al. | |
| 2017/0107055 A1 | 4/2017 | Magens et al. | |
| 2017/0114553 A1* | 4/2017 | Raman | E04F 21/1872 |
| 2017/0129133 A1* | 5/2017 | Bolivar | B28B 1/001 |
| 2017/0137271 A1* | 5/2017 | Shugen | B65G 1/04 |
| 2017/0243154 A1* | 8/2017 | Fletter | G06Q 10/063118 |
| 2017/0361462 A1* | 12/2017 | Chelian | B25J 5/005 |
| 2018/0004195 A1* | 1/2018 | Finke | G05B 19/41895 |
| 2018/0005173 A1 | 1/2018 | Elazary et al. | |
| 2018/0014988 A1* | 1/2018 | Diaz-Flores | A61G 5/04 |
| 2018/0032949 A1* | 2/2018 | Galluzzo | B25J 9/1692 |
| 2018/0036185 A1* | 2/2018 | Han | A61G 5/10 |
| 2018/0057265 A1* | 3/2018 | Manpat | G05D 1/0246 |
| 2018/0127212 A1* | 5/2018 | Jarvis | G05D 1/0234 |
| 2018/0319007 A1* | 11/2018 | Wilkinson | B66F 11/04 |
| 2019/0033837 A1* | 1/2019 | Zanger | B25J 5/007 |
| 2019/0196480 A1* | 6/2019 | Taylor | G05D 1/0088 |
| 2019/0291955 A1* | 9/2019 | Bastian, II | B65G 1/0492 |
| 2019/0291963 A1* | 9/2019 | Kero | B65G 23/34 |

FOREIGN PATENT DOCUMENTS

| | | |
|---|---|---|
| CN | 107600856 A | 1/2018 |
| EP | 3192616 A1 | 7/2017 |
| WO | 2016151505 A1 | 9/2016 |

OTHER PUBLICATIONS

Indiegogo Inc., Alpha Robot, Online article, Feb. 1, 2018 URL: https://www.indiegogo.com/projects/alpha-robot-moving-company-filming-leasing-and-more#/.

* cited by examiner

STOCKING ASSISTANT ROBOT

TECHNICAL FIELD

The present disclosure relates to stocking assistant robots, and more particularly, to stocking assistant robots that pick up items and place the items approximate to shelves where the items need to be stocked.

BACKGROUND

Stocking items on store shelves is a costly and time consuming endeavor in stores. The store shelves are generally replenished during a night shift operation. However, the available worker resource pool is limited during the night shift. Additionally, stocking requires continuous lifting and bending operations, which limit the number of available workers.

Accordingly, there is a need for assistant devices that help limited workers to stock items on shelves during night shift session.

SUMMARY

In one embodiment, a stocking assistant robot includes a base plate, one or more wheels coupled to the base plate, a first support coupled to the base plate, and a second support coupled to the base plate, wherein the first support is configured to move perpendicular to the base plate and the second support is configured to move perpendicular to the base plate. The stocking assistant robot also includes a first actuator configured to move the first support perpendicular to the base plate, and a second actuator configured to move the second support perpendicular to the base plate. The stocking assistant robot identifies an item, determines a stock location based on the identified item, operates one or more electric motors coupled to the one or more wheels based on the stock location, and moves the first support or the second support perpendicular to the base plate based on the stock location.

In another embodiment, a stocking assistant robot includes a base plate, one or more wheels coupled to the base plate, one or more electric motors coupled to the one or more wheels, and a controller. The controller includes one or more processors, one or more memory modules, and machine readable instructions stored in the one or more memory modules that, when executed by the one or more processors, cause the controller to: receive identification information about a plurality of items from a scanner; store an order of scanning the plurality of items based on the received identification information; determine locations related to the plurality of items based on the identification information; determine a driving route based on the locations and the order of scanning the plurality of items; and operate the one or more electric motors based on the driving route.

In yet another embodiment, an item stocking system includes one or more shelving units, and a stocking assistant robot. The stocking robot includes a base plate, one or more wheels coupled to the base plate, one or more electric motors coupled to the one or more wheels, and a controller. The controller includes one or more processors; one or more memory modules; and machine readable instructions stored in the one or more memory modules that, when executed by the one or more processors, cause the controller to: identify an item, identify a shelving unit related to the identified item; determine a location of the shelving unit; and operate the one or more electric motors based on the location of the shelving unit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments described herein are directed to stocking assistant robots that help workers stock items on store shelves. A stocking assistant robot includes a base plate, one or more wheels coupled to the base plate, a first support coupled to the base plate, and a second support coupled to the base plate, wherein the first support is configured to move perpendicular to the base plate and the second support is configured to move perpendicular to the base plate. The stocking assistant robot also includes a first actuator configured to move the first support perpendicular to the base plate, and a second actuator configured to move the second support perpendicular to the base plate. The stocking assistant robot identifies an item, determines a stock location based on the identified item, operates one or more electric motors coupled to the one or more wheels based on the stock location, and moves the first support or the second support perpendicular to the base plate based on the stock location. As such, the stocking assistant robot automatically scans and places items on the first support, carries the items to appropriate locations, and adjusts the height of the items comparable to the height of a shelf to be stocked. Thus, the stocking assistant robot increases stocking productivity by eliminating labor by workers. Additional, the stocking assistant robot increases stocking accuracy with item identification and shelf placement. Furthermore, the stocking assistant robot reduces injury and turn over by removing the majority of fatigue causing activities associated with stocking. Embodiments of stocking assistant robots will be described in more detail herein with reference to the attached figures.

Figure 1:
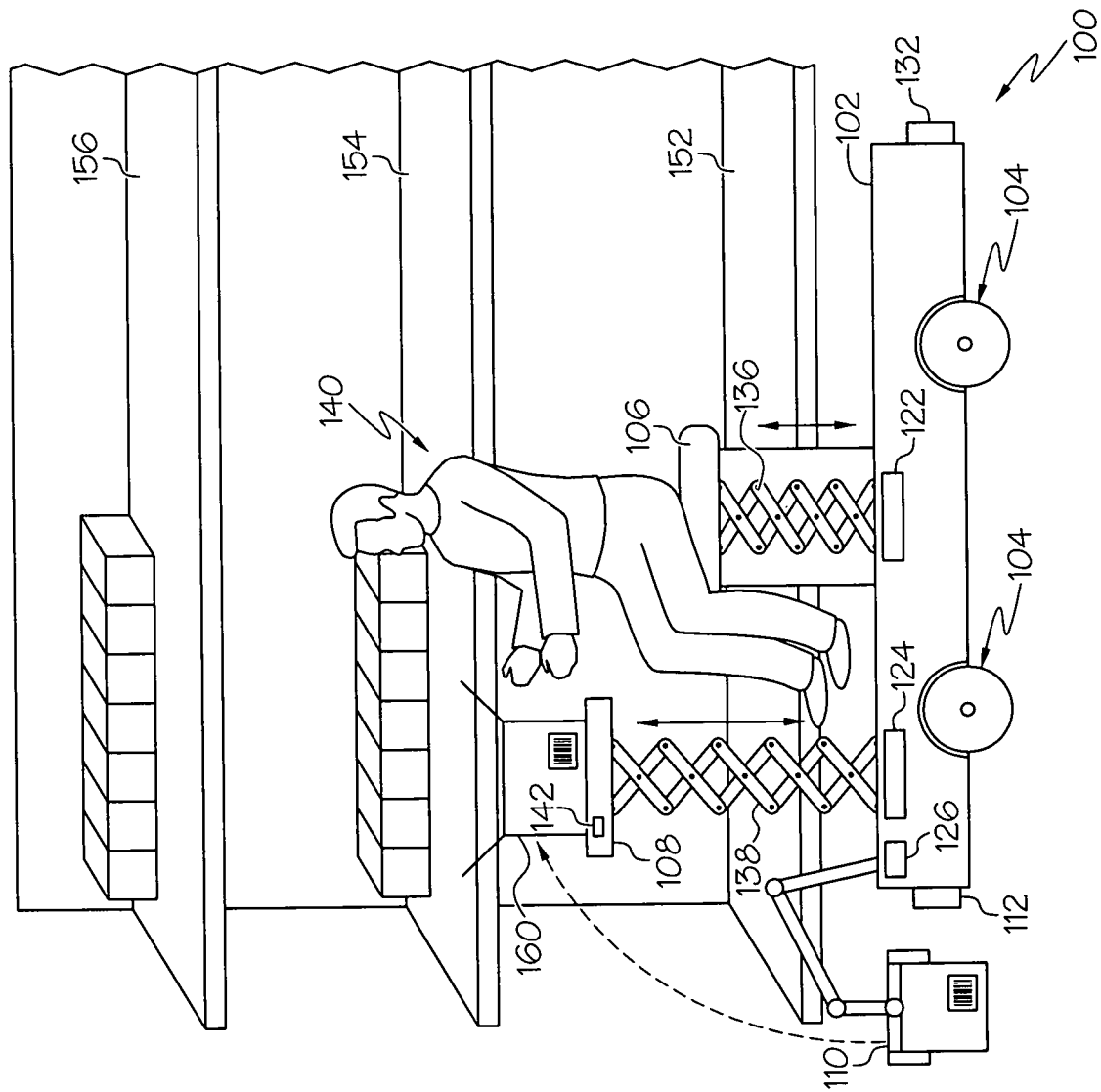
FIG. 1 depicts a stocking assistant robot according to one or more embodiments shown and described herein.

Referring to FIG. 1, a stocking assistant robot 100 according to one or more embodiments is schematically depicted. The stocking assistant robot 100 includes a base plate 102, one or more wheels 104 coupled to the base plate 102, a first support 106 mechanically coupled to the base plate 102, and a second support 108 mechanically coupled to the base plate 102. The one or more wheels 104 are mechanically coupled to one or more electric motors 240 (shown in FIG. 2), which are operable to drive the one or more wheels 104.

The first support 106 may be a seat where a worker 140 may sit on. The first support 106 is configured to move perpendicular to the base plate 102 (i.e., +/−y direction) by a first actuator 122. In embodiments, the first support 106 is connected to the base plate 102 via a scissor lift element 136 and the first actuator 122 moves the first support 106 in the +y or in the −y direction by operating the scissor lift element 136. While FIG. 1 depicts a scissor lift element 136 for raising and lowering the first support 106, any other mechanism to move the first support 106 upward or downward by the first actuator 122 may be used.

In embodiments, the first actuator 122 may adjust the height of the first support 106 such that the worker 140 sitting on the first support 106 may easily reach out to one of shelves 152, 154, and 156 as depicted in FIG. 1. The height of the first support 106 is defined as a distance from the ground to the top surface of the first support 106 in the +y direction. The first actuator 122 may operate the scissor lift element 136 to adjust the height of the first support 106 such that the worker 140 sitting on the first support 106 may easily reach out to the second shelf 154. When it is determined that the worker 140 needs to stock items on the third shelf 156, the first actuator 122 operates the scissor lift element 136 to raise the first support 106 such that the worker 140 sitting on the first support 106 may easily reach out to the third shelf 156. Stock locations of items may be determined based on the identification of items (e.g., by scanning barcodes of items, RFID tags, etc.), which will be described in detail below. When it is determined that the worker 140 needs to stock items on the first shelf 152, the first actuator 122 operates the scissor lift element 136 to lower the first support 106 such that the worker 140 sitting on the first support 106 may easily reach out to the first shelf 152.

In embodiments, the stocking assistant robot 100 may store predetermined heights of the first support 106 corresponding to the shelves 152, 154, and 156 in one or more memory modules 214 (FIG. 2), and control the scissor lift element 136 based on the predetermined heights. For example, the predetermined height of the first support 106 corresponding to the first shelf 152 may be a first height, the predetermined height of the first support 106 corresponding to the second shelf 154 may be a second height greater than the first height, and the predetermined height of the first support 106 corresponding to the third shelf 156 may be a third height greater than the second height. The first actuator 122 may operate the scissor lift element 136 to match the height of the first support 106 with one of the predetermined heights.

Items to be raised or lowered, such as boxes containing products, may be placed upon the second support 108. The second support 108 is configured to move perpendicular to the base plate 102 (i.e., +/−y direction) by a second actuator 124. For example, the second support 108 is connected to the base plate 102 via a scissor lift element 138, and the second actuator 124 operates the scissor lift element 138 to move the second support 108 in the +y or in the −y direction. While FIG. 1 depicts a scissor lift element for raising and lowering the second support 108, any other mechanism to move the second support 108 upward or downward by the second actuator 124 may be used. The second support 108 may include a weight sensor 142 configured to detect a weight of an object placed on the second support 108.

The second actuator 124 may adjust the height of the second support 108 such that the second support 108 may place items at the same height level as corresponding shelf. The height of the second support 108 is defined as a distance from the ground to the top surface of the second support 108 in the +y direction shown in FIG. 1. The second actuator 124 may operate the scissor lift element 138 to adjust the height of the second support 108 such that a box 160 on the second support 108 is at the same height as the second shelf 154. When it is determined that the items on the second support 108 should be stocked on the first shelf 152, the second actuator 124 operates the scissor lift element 138 to lower the second support 108 such that the box 160 on the second support 108 is at the same height as the first shelf 152.

In embodiments, the stocking assistant robot 100 may store predetermined heights of the second support 108 corresponding to the shelves 152, 154, and 156 in one or more memory modules 214 (FIG. 2), and control the scissor lift element 138 based on the predetermined heights. For example, the predetermined height of the second support 108 corresponding to the first shelf 152 may be the height of the first shelf 152, the predetermined height of the first support 106 corresponding to the second shelf 154 may be the height of the second shelf 154, the predetermined height of the first support 106 corresponding to the third shelf 156 may be the height of the third shelf 156. The second actuator 124 may operate the scissor lift element 138 to match the height of the second support 108 with one of the heights of the shelves 152, 154, and 156.

In some embodiments, the first actuator 122 and the second actuator 124 operate together such that the first support 106 and the second support 108 move upward or downward synchronously and the difference of height between the first support 106 and the second support 108 is maintained. In some embodiments, the stocking assistant robot 100 may include a single actuator instead of the first and second actuators 122 and 124, which operates both of scissor lift elements 136 and 138 to move the first support 106 and the second support 108 upward or downward simultaneously.

In embodiments, the stocking assistant robot 100 includes a robot arm 110 configured to grasp a box and move the box onto the second support 108. The robot arm 110 is operated by an actuator 126. The actuator 126 may move the robot arm 110 toward an identified box and grab the box using, e.g., fingers. Then, the actuator 126 operates to pivot the robot arm 110 to place the box onto the second support 108. While the robot arm 110 includes multiple joints to translate the box from one place to another in FIG. 1, any other mechanical holding device may be used. In some embodiments, the stocking assistant robot 100 may not include the robot arm 110.

In embodiments, the stocking assistant robot 100 includes a reader 112. The reader 112 may be an RFID reader configured to read an RFID chip in a box proximate to the RFID reader. In some embodiments, the reader 112 may be a barcode reader configured to read a barcode on the surface of a box proximate to the bar code reader.

Figure 2:
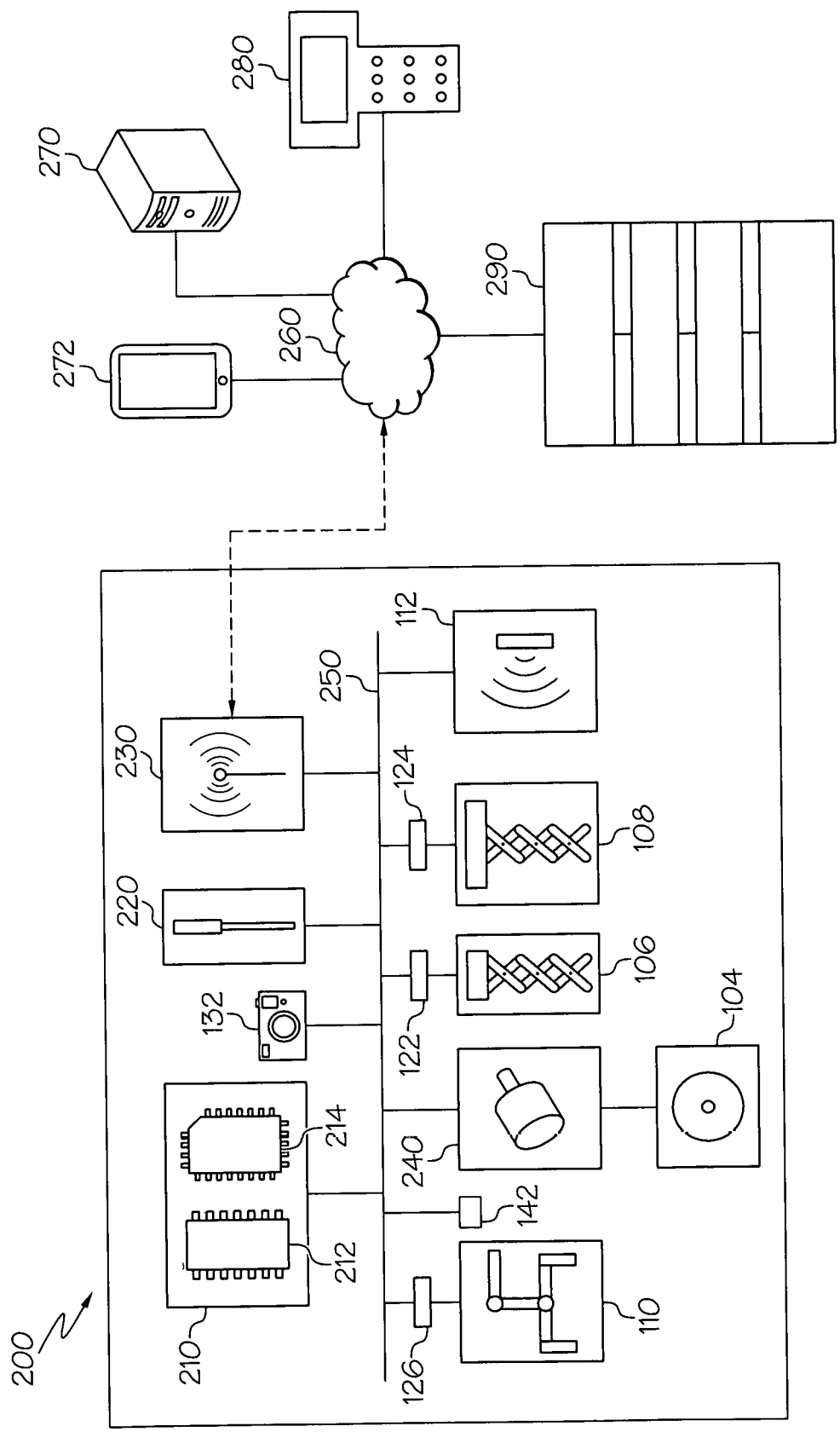
FIG. 2 depicts a schematic diagram of an example stocking assistant robot communicating with other devices, according to one or more embodiments shown and described herein.

FIG. 2 depicts a schematic diagram of a stocking assistant robot 200 communicating with other devices, according to one or more embodiments shown and described herein. The stocking assistant robot 200 includes a controller 210 that includes one or more processors 212 and one or more memory modules 214. Each of the one or more processors 212 may be any device capable of executing machine readable and executable instructions. Accordingly, each of the one or more processors 212 may be a controller, an integrated circuit, a microchip, a computer, or any other computing device. The one or more processors 212 are coupled to a communication path 250 that provides signal interconnectivity between various modules of the stocking assistant robot 200. Accordingly, the communication path 250 may communicatively couple any number of processors 212 with one another, and allow the modules coupled to the communication path 250 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 250 may be formed from any medium that is capable of transmitting a signal such as, for example, conductive wires, conductive traces, optical waveguides, or the like. In some embodiments, the communication path 250 may facilitate the transmission of wireless signals, such as Wi-Fi, Bluetooth, Near Field Communication (NFC) and the like. Moreover, the communication path 250 may be formed from a combination of mediums capable of transmitting signals. In one embodiment, the communication path 250 comprises a combination of conductive traces, conductive wires, connectors, and buses that cooperate to permit the transmission of electrical data signals to components such as processors, memories, sensors, input devices, output devices, and communication devices. Accordingly, the communication path 250 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 214 are coupled to the communication path 250. The one or more memory modules 214 may comprise RAM, ROM, flash memories, hard drives, or any device capable of storing machine readable and executable instructions such that the machine readable and executable instructions can be accessed by the one or more processors 212. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 214. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more memory modules 214 may store a store map and location information about products in the store. The one or more memory modules 214 may also store predetermined heights of the first support 106 and the second support 108.

Referring to FIG. 2, the stocking assistant robot 200 includes one or more electric motors 240 that are coupled to the communication path 250. The one or more electric motors 240 are connected to the one or more wheels 104 (shown in FIG. 1) and provide torque to the one or more wheels 104. The one or more electric motors 240 are coupled to the communication path 250 and receive instructions from the controller 210. For example, the controller 210 may control the rotation speed and rotation direction of the one or more electric motors 240 in order to move the wheels 104, and consequently the steering assistant robot 200.

Referring still to FIG. 2, the stocking assistant robot 200 includes one or more cameras 132. The one or more cameras 132 may be any device having an array of sensing devices (e.g., pixels) capable of detecting radiation in an ultraviolet wavelength band, a visible light wavelength band, or an infrared wavelength band. The one or more cameras 132 may have any resolution. The one or more cameras 132 may include an omni-directional camera, or a panoramic camera.

The one or more cameras 132 are coupled to the communication path 250 and communicate with other components of the stocking assistant robot 200. The one or more cameras 132 may capture images of environment external to the stocking assistant robot 200. The one or more memory modules 214 may include instructions for processing images received from one or more cameras 132. For example, the one or more processors 212 implement the instructions in the one or more memory modules 214 to process an image from the one or more cameras 132 to identify objects proximate to the stocking assistant robot 200. Any image processing technology may be used to process images from the one or more cameras 132. Based on the identified objects, the controller 210 may control the orientation and speed of the stocking assistant robot 200, for example, by controlling the one or more electric motors 240 to drive the stocking assistant robot 200.

Referring still to FIG. 2, the reader 112 is coupled to the communication path 250. The reader 112 may be an RFID reader or a barcode reader. The reader 112 reads RFID tags or barcodes of boxes proximate to the reader and communicates the information read by the reader 112 (e.g., information about products within the boxes) to the controller 210 of the stocking assistant robot 200.

Referring still to FIG. 2, the one or more actuators 126 are coupled to the communication path 250. The one or more actuators 126 control the movement of the robot arm 110. The controller 210 may send instructions to the one or more actuator 126 to move the robot arm 110 to hold a box proximate to the stocking assistant robot 200 and place the box on the second support 108. When the robot arm 110 holds the box, the reader 112 may read an RFID tag or a barcode of the box and transmit the read information to the controller 210.

Referring still to FIG. 2, the first actuator 122 that moves the first support 106 is coupled to the communication path 250, and the second actuator 124 that moves the second support 108 is coupled to the communication path 250. The first actuator 122 moves the first support 106 perpendicular to the base plate 102 in response to instructions from the controller 210. The second actuator 124 moves the second support 108 perpendicular to the base plate 102 in response to instructions from the controller 210.

Referring still to FIG. 2, the stocking assistant robot 200 includes a weight sensor 142 coupled to the communication path 250 such that the communication path 250 communicatively couples the weight sensor 142 to other modules of the stocking assistant robot 200. The weight sensor 142 detects an event of placing an object on the second support 108 or an event of removing an object placed on the second support.

Referring still to FIG. 2, the stocking assistant robot 200 includes a satellite antenna 220 coupled to the communication path 250 such that the communication path 250 communicatively couples the satellite antenna 220 to other modules of the stocking assistant robot 200. The satellite antenna 220 is configured to receive signals from global positioning system satellites. Specifically, in one embodiment, the satellite antenna 220 includes one or more conductive elements that interact with electromagnetic signals transmitted by global positioning system satellites. The received signal is transformed into a data signal indicative of the location (e.g., latitude and longitude) of the satellite antenna 220 or an object positioned near the satellite antenna 220, by the one or more processors 212. The data signal may be used to determine the location of the stocking assistant robot 200, e.g., within a store. In some embodiments, the stocking assistant robot 200 does not include the satellite antenna 220.

The stocking assistant robot 200 includes network interface hardware 230 for communicatively coupling the stocking assistant robot 200 to a network 260, which may in turn be communicatively coupled to a remote server 270, a mobile device 272, a retail associate device 280, and/or a modular shelving unit 290. The network interface hardware 230 is coupled to the communication path 250 such that the communication path 250 communicatively couples the network interface hardware 230 to other modules of the stocking assistant robot 200. The network interface hardware 230 may be any device capable of transmitting and/or receiving data via a wireless network. Accordingly, the network interface hardware 230 may include a communication transceiver for sending and/or receiving data according to any wireless communication standard. For example, the network interface hardware 230 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 230 includes a Bluetooth transceiver that enables the stocking assistant robot 200 to exchange information with the mobile device 272 (e.g., a smartphone) via Bluetooth communication.

Still referring to FIG. 2, data from various applications running on the mobile device 272 may be provided from the mobile device 272 to the stocking assistant robot 200 via the network interface hardware 232. The mobile device 272 may be any device having hardware (e.g., chipsets, processors, memory, etc.) for communicatively coupling with the network interface hardware 230 and the network 260. Specifically, the mobile device 272 may include an antenna for communicating over one or more of the wireless computer networks described above. Moreover, the mobile device 272 may include a mobile antenna for communicating with the network 260. Accordingly, the mobile antenna may be configured to send and receive data according to a mobile telecommunication standard of any generation (e.g., 1G, 2G, 3G, 4G, 5G, etc.). Specific examples of the mobile device 272 include, but are not limited to, smart phones, tablet devices, e-readers, laptop computers, or the like. In embodiments, the mobile device 272 may include software applications for controlling the stocking assistant robot 200. For example, a software application may send an instruction to the stocking assistant robot 200 that instructs the stocking assistant robot 200 to drive along a route that is determined based on information about items to stock. As another example, a software application stored in the mobile device 272 may display a user interface such that the user of the mobile device 272 may control the driving direction and speed of the stocking assistant robot 200. The software application stored in the mobile device 272 may also display a user interface such that the user of the mobile device 272 may adjust the height of the first support 106 and the second support 108.

The network 260 generally includes a plurality of base stations that are configured to receive and transmit data according to mobile telecommunication standards. The base stations are further configured to receive and transmit data over wired systems such as public switched telephone network (PSTN) and backhaul networks. The network 260 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the network 260 may be utilized as a wireless access point by the network interface hardware 230 or the mobile device 272 to access one or more servers (e.g., the remote server 270). The remote server 270 generally includes processors, memory, and chipset for delivering resources via the network 260. Resources may include providing, for example, processing, storage, software, and information from the remote server 270 to the stocking assistant robot 200 via the network 260. In some embodiments, the remote server 270 may include autonomous driving algorithms for the stocking assistant robot 200 such that the stocking assistant robot 200 may drive autonomously by communicating with the remote server 270. In some embodiments, the stocking assistant robot 200 may receive data that is used for autonomous driving from the remote server 270. For example, the stocking assistant robot 200 may receive store map data from the remote server 270 based on the current location of the stocking assistant robot 200. As another example, the stocking assistant robot 200 may transmit raw data obtained by the one or more cameras 132 and the satellite antenna 220 to the remote server 270 and receive processed data from the remote server 270. It should be understood that the network interface hardware 230 may be communicatively coupled to any number of servers by way of the network 260.

The network interface hardware 230 may be communicatively coupled to the network 260 and may communicate with the retail associate device 280 via the network 260. The retail associate device 280 is a mobile computing device that may be used by a retail associate at a store to assist in the performance of a variety of functions, such as restocking shelves, resetting planograms, scanning product SKUs, retrieving products ordered by customers, and the like. The retail associate device 280 is a computing device that includes a processor, a data storage component, a non-transitory memory component, input/output hardware, network interface hardware, and a local interface. The processor of the retail associate device 280 includes a processing component configured to receive and execute instructions from the data storage component of the memory component. The memory component of the retail associate device 280 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. The data storage device or the memory component may be configured to store logic that causes the retail associate device 280 to perform the functions described herein when executed by the processor. The input/output hardware of the retail associate device 280 may include a display device (e.g., a touch screen, LCD screen, plasma screen, TFT screen, or the like), a tactile input device (e.g., a keypad, button, keyboard, mouse, or the like), a camera, a barcode reader, a microphone, a speaker, or the like, for receiving, sending, and/or presenting data. The display device of the retail associate device 280 may display a user interface such that the user of the retail associate device 280 may control the driving direction and speed of the stocking assistant robot 200. The display device of the retail associate device 280 may also display a user interface such that the user of the retail associate device 280 may adjust the height of the first support 106 and the second support 108.

The network interface hardware 230 of the retail associate device 280 may include any wired or wireless networking hardware, such as a modem, LAN port, wireless fidelity (Wi-Fi) card, WiMax card, mobile communications hardware, and/or other hardware for communicating with the remote server 270, the stocking assistant robot 200 or with other devices. The local interface of the retail associate device 280 may be implemented as a bus or other interface to facilitate communication among the components of the retail associate device 280. While FIG. 2 only depicts a single retail associate device 280, some embodiments may include a plurality of retail associate devices, each of which may be carried and used by a different retail associate.

The network interface hardware 230 may be communicatively coupled to the network 260 and may communicate with a modular shelving system 290 via the network 260. The details of the modular shelving system 290 will be described below with reference to FIG. 3. The modular shelving system 290 includes a plurality of display units. The stocking assistant robot 200 may send instructions to one of the display units to display a certain indication (e.g., blinking, displaying a certain color, etc.). For example, the stocking assistant robot 200 may identify a location where the box 160 (shown in FIG. 1) to be placed, determine a display unit associated with the identified location, and send instructions to the display unit to blink or display an indication, e.g., "stock the box here."

Figure 3:
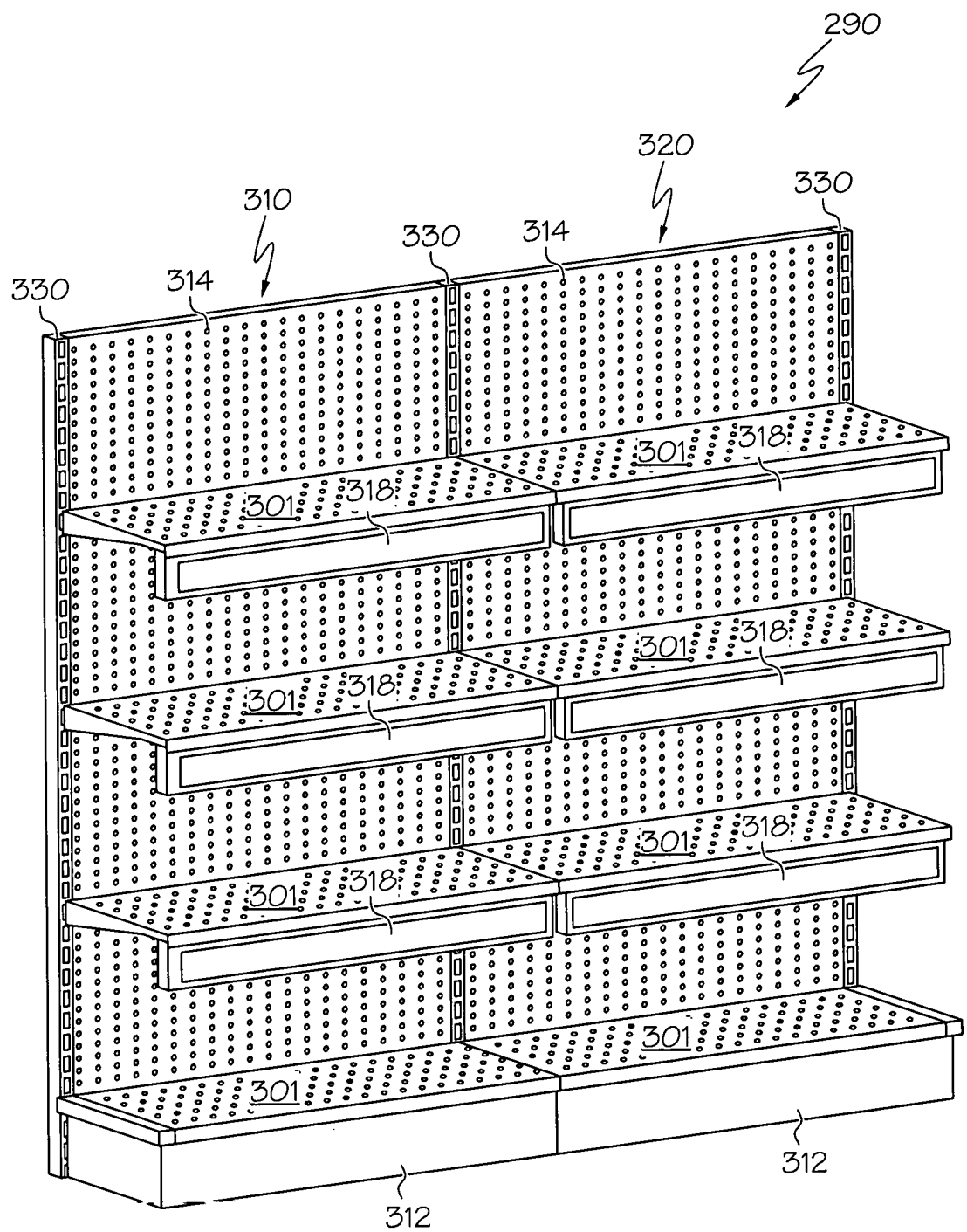
FIG. 3, depicts a perspective view of a modular shelving system, according to one or more embodiments shown and described herein.

Referring now to FIG. 3, a perspective view of a modular shelving system 290 including a first shelving module 310, a second shelving module 320, and a plurality of interfacing uprights 330 is schematically depicted. Each of the first shelving module 310 and the second shelving module 320 includes a base 312, a back plane 314, a plurality of shelves 301, and a plurality of display units 318. The back plane 314 is generally planar and extends substantially perpendicularly from the base 312. The plurality of shelves 301 are secured to the plurality of interfacing uprights 330, each of which includes a plurality of apertures through which corresponding projections of the plurality of shelves 301 may be inserted to mount the plurality of shelves 301 to the shelving modules. The plurality of shelves 301 extend substantially perpendicularly from the back plane 314 in a direction that is substantially parallel to the base 312. The assembly of the shelving modules and the interfacing uprights 330 support the plurality of shelves 301 on which products may be placed. The plurality of display units 318 extend beneath the plurality of shelves 301 and are operable to display information to a person near the shelving modules, such as information pertaining to products on the plurality of shelves 301, information useful to stock products on the plurality of shelves 301, information useful to retrieve products from the plurality of shelves 301, and a variety of additional information, as will be described in detail below.

Still referring to FIG. 3, in some embodiments, each of the plurality of display units 318 is powered by an Ethernet connection or through the back plane 314, as described in U.S. patent application Ser. No. 13/734,443, entitled "DISPLAY SHELF MODULES WITH PROJECTORS FOR DISPLAYING PRODUCT INFORMATION AND MODULAR SHELVING SYSTEMS COMPRISING THE SAME," the entirety of which is incorporated by reference herein. In other embodiments, each of the plurality of display units 318 is powered by a power distribution system. In some embodiments, the plurality of display units 318 is powered in another manner, such as via batteries, or the like.

Still referring to FIG. 3, in some embodiments, each of the plurality of display units 318 includes a projector unit and a display screen, as described in U.S. patent application Ser. No. 13/734,443, entitled "DISPLAY SHELF MODULES WITH PROJECTORS FOR DISPLAYING PRODUCT INFORMATION AND MODULAR SHELVING SYSTEMS COMPRISING THE SAME," the entirety of which is incorporated by reference herein. In other embodiments, one or more of the plurality of display units 318 includes a powered display screen, such as a TFT screen, an LCD screen, or the like. In some embodiments, the modular shelving system 290 may include one or more additional input or output components, such as a microphone (e.g., for receiving voice input from a consumer); a camera, a barcode reader, a speaker, or the like.

Figure 4:
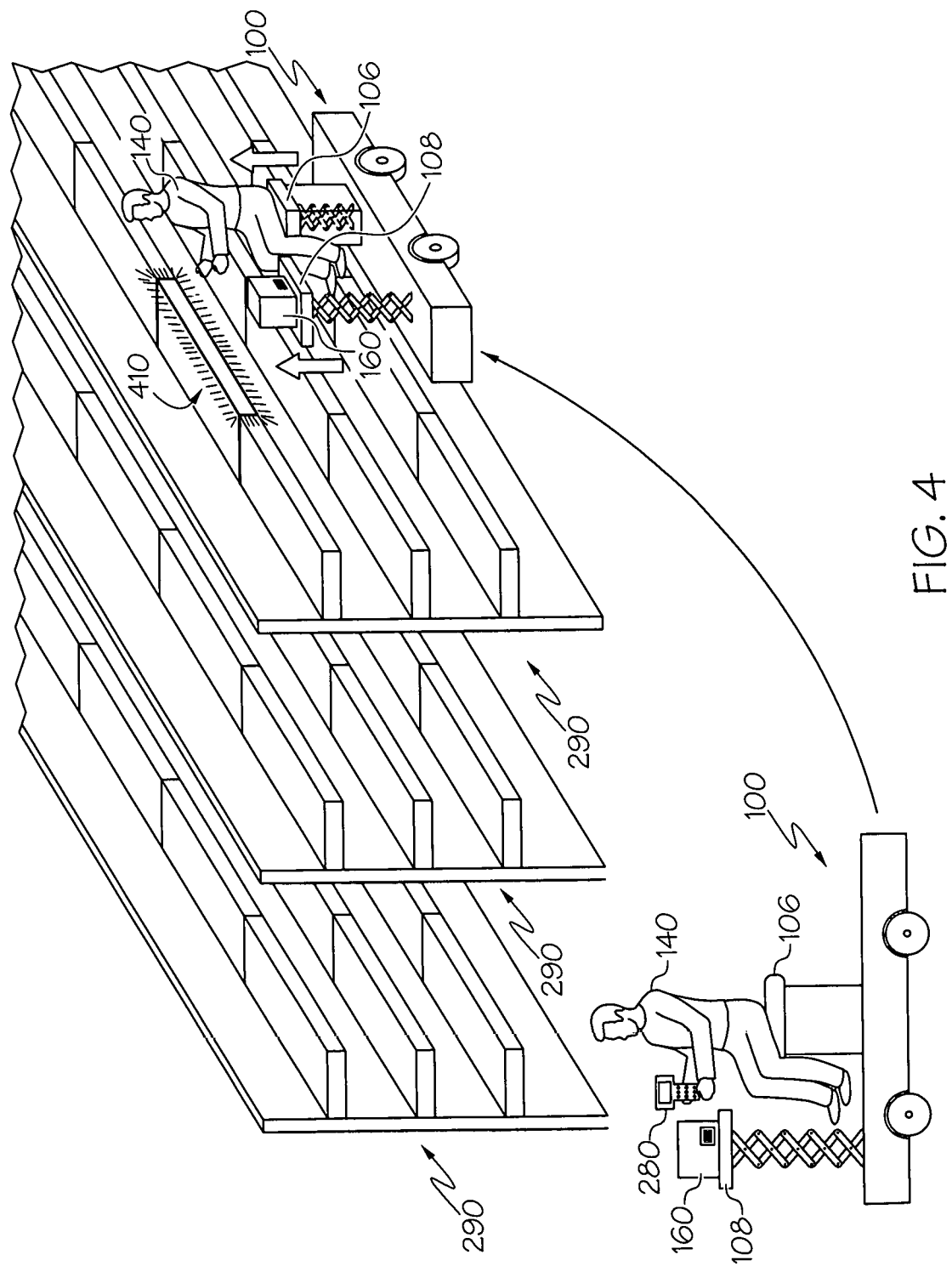
FIG. 4 depicts operations of the stocking assistant robot in connection with the modular shelving systems, according to one or more embodiments shown and described herein.

FIG. 4 depicts operations of the stocking assistant robot 100 in connection with the modular shelving systems, according to one or more embodiments shown and described herein. As depicted in FIG. 4, the stocking assistant robot 100 may identify the box 160, e.g., by reading a barcode on the box 160 using a barcode reader, or by reading a RFID tag in the box 160 using a RFID reader. For example, the reader 112 (FIG. 1) of the stocking assistant robot 100 reads the barcode on the box 160. As another example, the worker 140 may read a barcode on the box 160 with the retail associate device 280, and the retail associate device 280 communicates the read barcode to the stocking assistant robot 100. Then, the stocking assistant robot 100 determines a location where the box is to be stocked. For example, the stocking assistant robot 100 retrieves a store map including locations of items, and determines the location of the box to be stocked based on the store map. The store map may store items and their corresponding locations (e.g., the location of a shelving module). In this example shown in FIG. 4, the stocking assistant robot 100 determines that the box 160 is to be stocked on the shelving module 410. The stocking assistant robot 100 may drive toward the shelving module 410 based on the store map. In some embodiments, the stocking assistant robot 100 may drive autonomously toward the shelving module 410. In some embodiments, the retail associate device 280 displays a location of the box 160 to be stocked, and the worker 140 may drive the stocking assistant robot 100 to the shelving module 410 based on the displayed location.

In some embodiments, the stocking assistant robot 100 may communicate with a shelving module where the box 160 is to be stocked. In the example shown in FIG. 4, the stocking assistant robot 100 may communicate with the shelving module 410 via the network 260. For example, when the barcode of the box 160 is read by a barcode reader or the retail associate device 280, the stocking assistant robot 100 may send to the shelving module 410 an indication that the box 160 is to be stocked on the shelving module 410. In response to receiving the indication, a display unit of the shelving module 410 may blink or display a certain indication that the worker 140 may easily identify the shelving module 410.

Once the stocking assistant robot 100 arrives at the shelving module 410, the controller 210 of the stocking assistant robot 100 may adjust the height of the first support 106 and the second support 108 by operating the first actuator 122 and the second actuator 124. For example, the shelving module 410 is on the third shelf of the modular shelving system 290 in FIG. 4. The stocking assistant robot 100 raises the first support 106 and the second support 108 such that the box 160 may be at the same height as the shelving module 410 and the worker 140 can translate the box 160 to the shelving module 410 without exerting a force against gravity substantially (i.e., without manually lifting up or lifting down the box 160).

Figure 5:
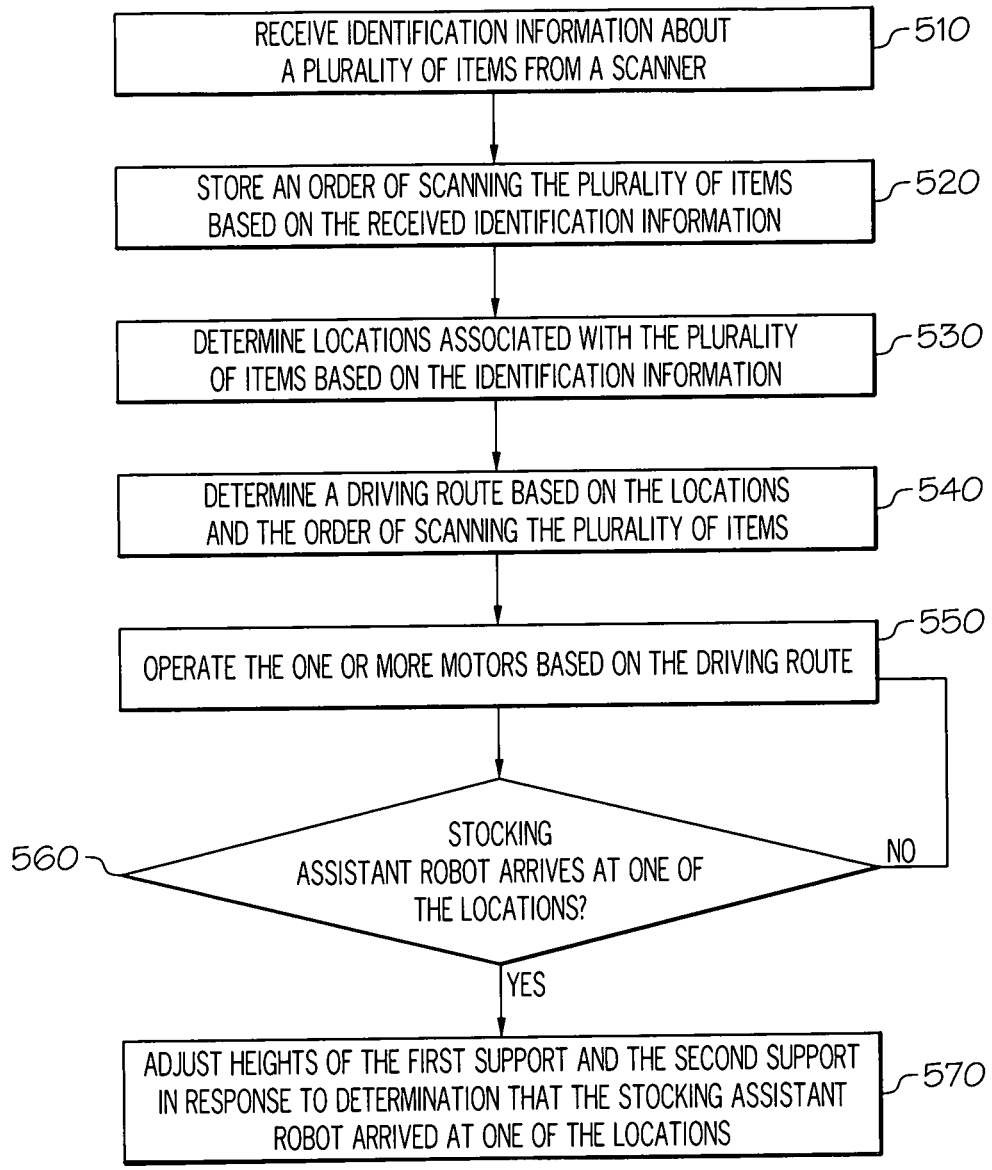
FIG. 5 depicts a flowchart for stocking items using the stocking assistant robot, according to one or more embodiments shown and described herein.
Figure 6A:
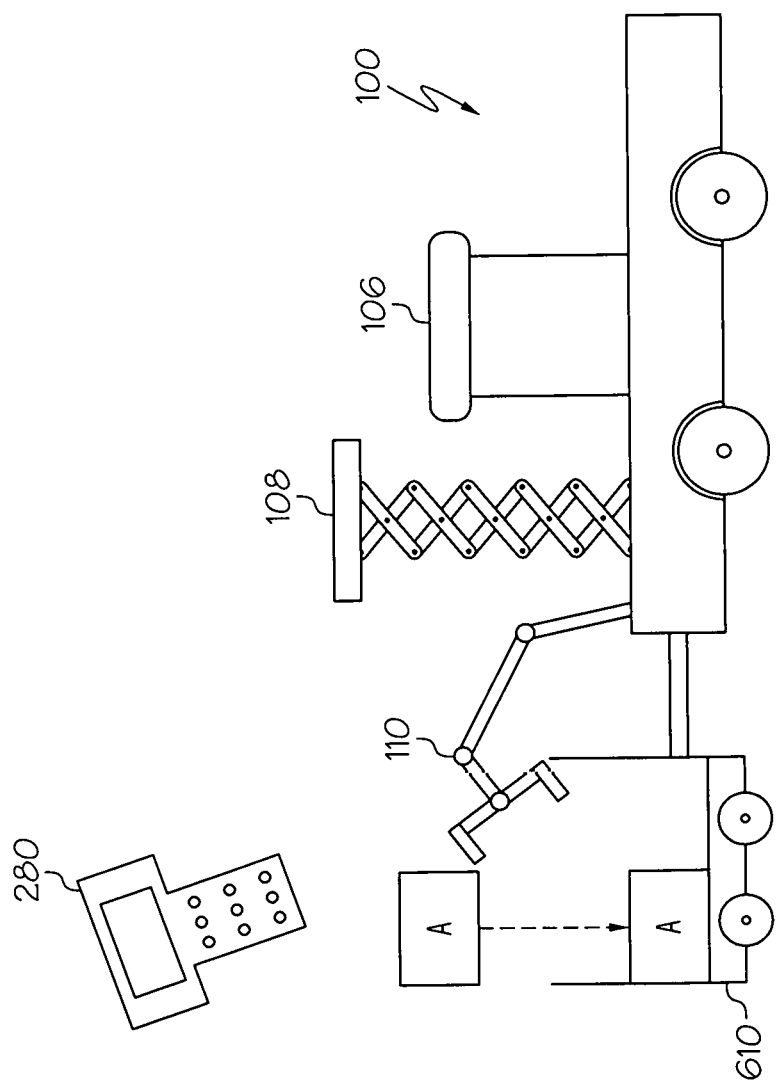
FIG. 6A depicts storing an item in a storage cart, according to one or more embodiments shown and described herein.
Figure 6B:
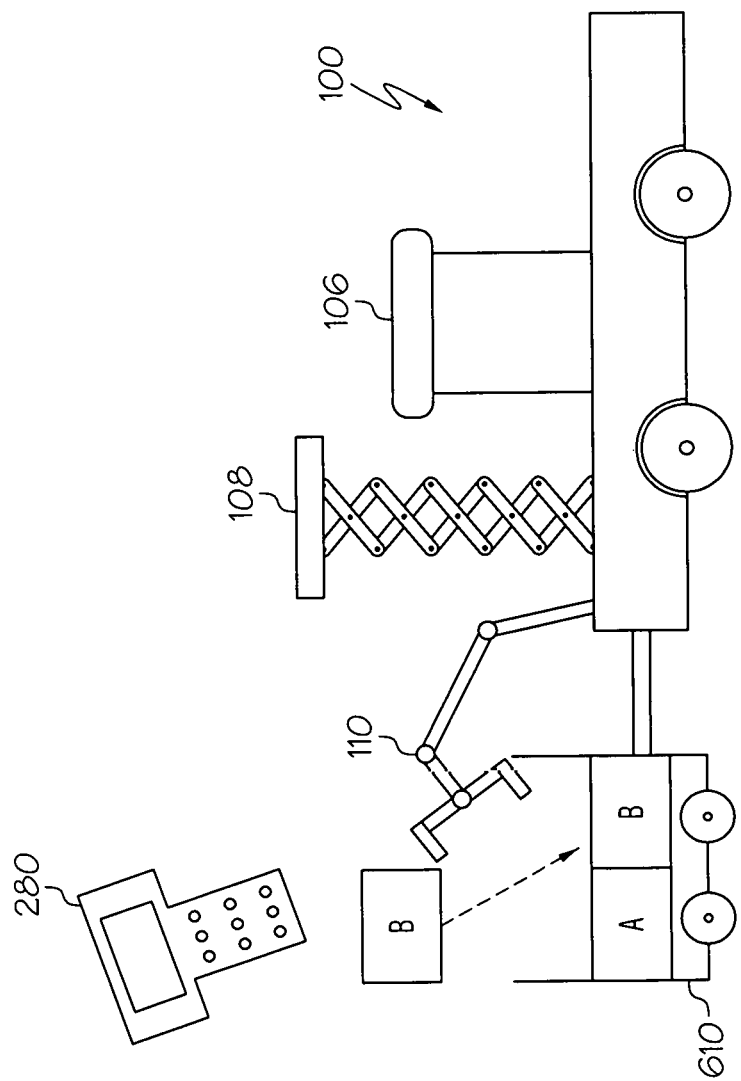
FIG. 6B depicts storing another item in a storage cart, according to one or more embodiments shown and described herein.
Figure 6C:
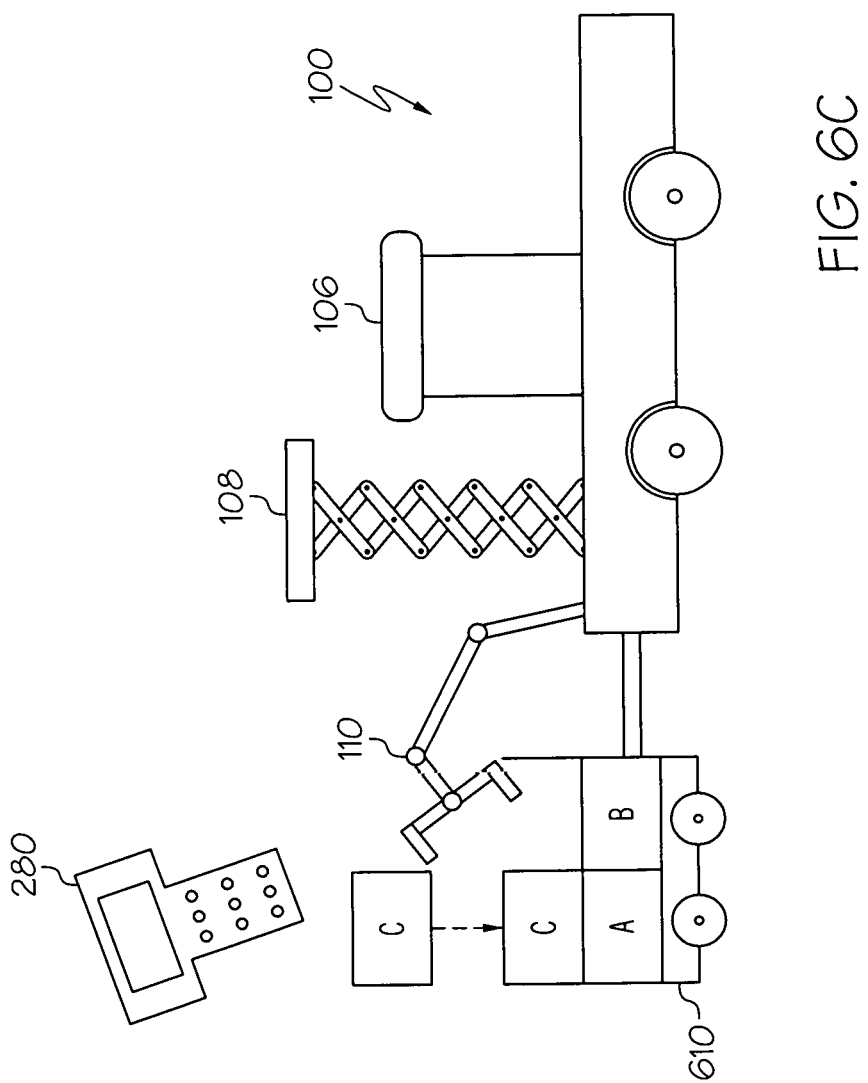
FIG. 6C depicts storing another item in a storage cart, according to one or more embodiments shown and described herein.

FIG. 5 depicts a flowchart for stocking items using the stocking assistant robot 100, according to one or more embodiments shown and described herein. In step 510, the stocking assistant robot 100 receives identification information about a plurality of items from a scanner. For example, as depicted in FIGS. 6A through 6C, items A, B, and C are scanned by the retail associate device 280 and placed in a storage cart 610. The items A, B, and C are stocked in a stock room, and the stocking assistant robot 100 may move to the stock room to pick up the items. The retail associate device 280 communicates the scanned information about items A, B, and C to the stocking assistant robot 100. In some embodiments, the reader 112 (FIG. 1) may scan the items A, B, and C.

In step 520, the stocking assistant robot 100 stores an order of scanning the plurality of items based on the received identification information. For example, the stocking assistant robot 100 receives scanned information about item A, item B, and item C in order. Thus, the stocking assistant robot 100 stores the order of scanning items A, B, and C.

In step 530, the stocking assistant robot 100 determines locations associated with the plurality of items based on the identification information. For example, the stocking assistant robot 100 receives identification information about items A, B, and C, and retrieves locations for items A, B, and C from a database that associate items with corresponding locations. Specifically, the stocking assistant robot 100 determines the location for item A as Aisle 2, Section 6, Shelf 3 by looking into the database. Similarly, the stocking assistant robot 100 determines the location for item B as Aisle 1, Section 7, Shelf 2, and the location for item C as Aisle 3, Section 3, Shelf 1 as depicted in FIGS. 6B and 6C.

Figure 7:
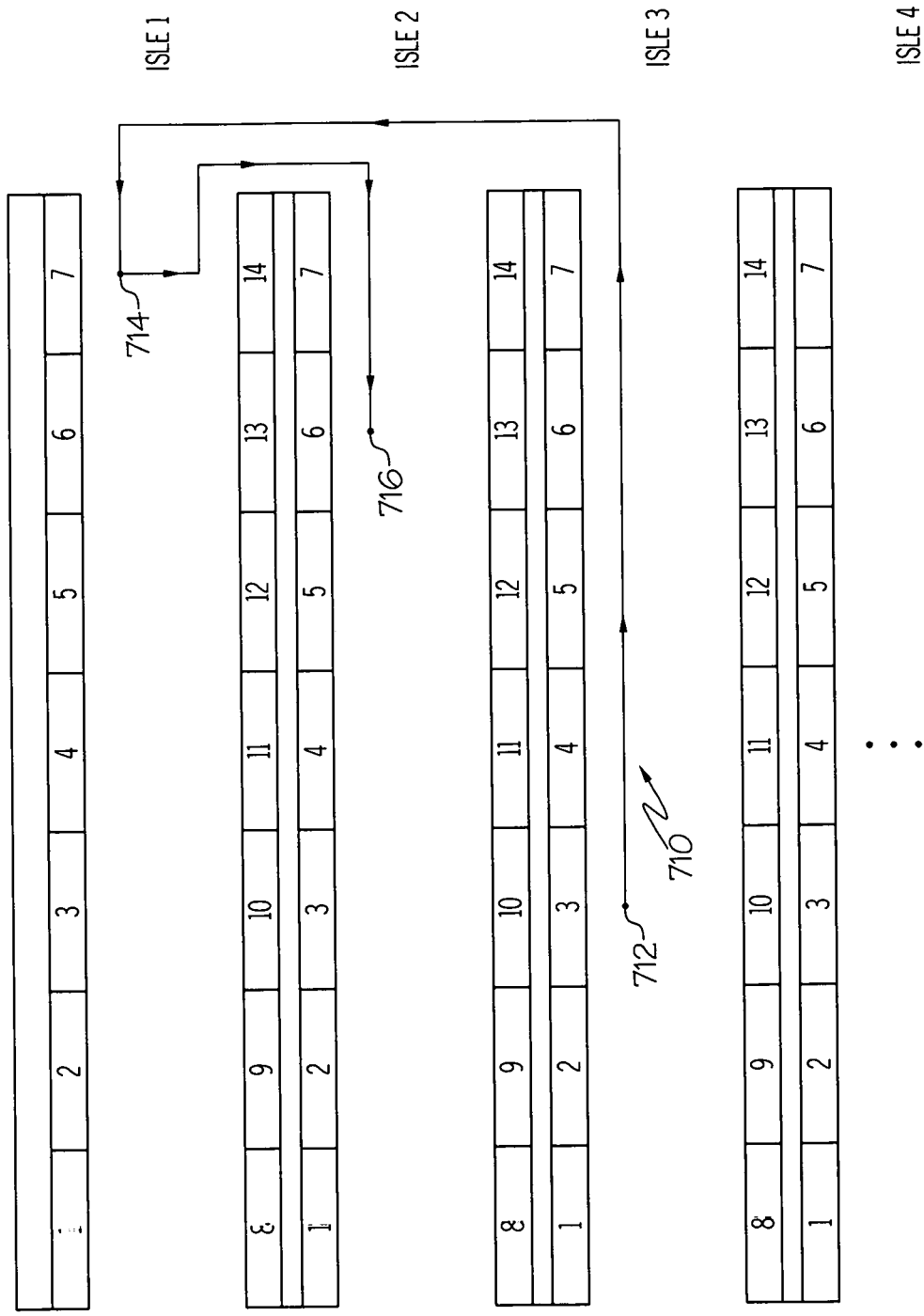
FIG. 7 depicts a driving route of the stocking assistant robot, according to one or more embodiments shown and described herein.

In step 540, the stocking assistant robot 100 determines a driving route based on the locations and the order of scanning the plurality of items. In embodiments, the stocking assistant robot 100 determines the driving route that starts with the location for the last scanned item and ends with the location for the first scanned item. That is, the driving route follows a reverse order of scanning the items such that the stocking assistant robot 100 arrives at the location for the last scanned item first and arrives at the location for the first scanned item at the end. For example, the stocking assistant robot 100 determines a driving route that starts with the location for item C (i.e., Aisle 3, Section 3, Shelf 1) and ends with the location for item A (i.e., Aisle 2, Section 6, Shelf 3). FIG. 7 illustrates a driving route 710 determined based on locations for items A, B, and C. The driving route 710 includes a first location 712 for item C, a second location 714 for item B, and a third location 716 for item A.

In step 550, the stocking assistant robot 100 operates the one or more electric motors 240 based on the driving route. For example, the stocking assistant robot 100 follows the driving route 710 shown in FIG. 7. By following the driving route 710, the stocking assistant robot 100 helps the worker 140 stock the last scanned item (e.g., item C) first, and the first scanned item (e.g., item A) at the end. Because the first scanned item is stored at the bottom of the storage cart 610 and the last scanned item is stored at the top of the storage cart 610, the driving route that follows the reverse order of scanning the items enhance stocking efficiency.

In step 560, the stocking assistant robot 100 determines whether the stocking assistant robot 100 arrives at one of the locations for the items. For example, the stocking assistant robot 100 determines whether the stocking assistant robot 100 arrives at one of the first location 712 for item C, the second location 714 for item B, and the third location 716 for item A. If it is determined that the stocking assistant robot 100 has not arrived at one of the locations for the items, the stocking assistant robot 100 continues to follow the driving route as shown in the flowchart.

If it is determined that the stocking assistant robot 100 arrives at one of the locations for the items, the stocking assistant robot 100 stops following the driving route and adjusts heights of the first support 106 and the second support 108 in step 570. For example, if it is determined that the stocking assistant robot 100 arrived at Aisle 3, Section 3, the stocking assistant robot 100, the stocking assistant robot 100 adjusts the heights of the first support 106 and the second support 108 such that the worker 140 can move item C to the corresponding shelving module without substantially exerting a force against gravity. In the example, item C is to be stocked on Shelf 1 of the modular shelving system 290 as depicted in FIG. 6C. The stocking assistant robot 100 lowers the first support 106 and the second support 108 such that the worker 140 can easily move item C form the second support 108 to corresponding shelving unit without substantially exerting a force against gravity. In some embodiments, the robot arm 110 may transfer the item at the top of the storage cart 610 onto the second support 108 before the stocking assistant robot 100 arrives at one of the destinations. For example, the robot arm 110 may transfer item C which is at the top of the storage cart 610 onto the second support 108 before the stocking assistant robot 100 arrives at Aisle 3, Section 3. Similarly, once the item C has been stocked, the robot arm 110 may transfer item B onto the second support 108 before the stocking assistant robot 100 arrives at the destination for item B.

Once the stocking process for item C is complete, the stocking assistant robot 100 continues to follow the driving route. In embodiments, the worker 140 may instruct the stocking assistant robot 100 to continue to follow the driving route once the stocking process is complete. In some embodiments, the controller 210 of the stocking assistant robot 100 determines that item C on the second support 180 has been removed based on data received form the weight sensor 142. For example, the weight detected by the weight sensor 142 changes from the weight of item C to zero, then the controller 210 determines that the item C has been stocked, and the stocking assistant robot 100 continues to follow the driving route.

When the stocking assistant robot 100 arrives at the second location 714 for item B, the stocking assistant robot 100 raises the first support 106 and the second support 108 based on the stock location of the item B, which is Shelf 3 of the modular shelving system 290.

It should now be understood that the stocking assistant robots described herein reduce labor force significantly. A stocking assistant robot includes a base plate, one or more wheels coupled to the base plate, a first support coupled to the base plate, and a second support coupled to the base plate, wherein the first support is configured to move perpendicular to the base plate and the second support is configured to move perpendicular to the base plate. The stocking assistant robot also includes a first actuator configured to move the first support perpendicular to the base plate, and a second actuator configured to move the second support perpendicular to the base plate. The stocking assistant robot identifies an item, determines a stock location based on the identified item, operates one or more electric motors coupled to the one or more wheels based on the stock location, and moves the first support or the second support perpendicular to the base plate based on the stock location. As such, the stocking assistant robot automatically may scan and place items on the first support, carries the items to appropriate locations, and adjusts the height of the items comparable to the height of a shelf to be stocked. Thus, the stocking assistant robot increases stocking productivity by eliminating labor by workers. Additional, the stocking assistant robot increases stocking accuracy with item identification and shelf placement. Furthermore, the stocking assistant robot reduces injury and turn over by removing the majority of fatigue causing activities associated with stocking.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A stocking assistant robot comprising:
   a base plate;
   one or more wheels coupled to the base plate; and
   a controller configured to:
      receive identification information about a plurality of items from a scanner;
      store an order of scanning the plurality of items based on the received identification information;
      determine locations related to the plurality of items based on the identification information;
      determine a driving route based on the locations and the order of scanning the plurality of items; and
      operate the one or more wheels based on the driving route,
      wherein the driving route starts with a location of an item scanned last among the plurality of items and ends with a location of an item scanned first among the plurality of items.

2. The stocking assistant robot of claim 1, wherein the controller is configured to:
   identify an item;
   determine a stock location based on the identified item; and
   operate the one or more wheels based on the stock location.

3. The stocking assistant robot of claim 1, further comprising one or more memory modules that include a store map including a stock location.

4. The stocking assistant robot of claim 1, further comprising:
   a first support coupled to the base plate;
   a second support coupled to the base plate;
   a first actuator configured to move the first support perpendicular to the base plate; and
   a second actuator configured to move the second support perpendicular to the base plate.

5. The stocking assistant robot of claim 4, wherein the first support includes a scissor lift element.

6. The stocking assistant robot of claim 4, further comprising an arm configured to hold an item to be placed on the second support.

7. The stocking assistant robot of claim 4,
   wherein the controller is configured to operate the first actuator or the second actuator to move the first support or the second support perpendicular to the base plate based on a stock location.

8. The stocking assistant robot of claim 4,
   the controller is configured to operate the first actuator and the second actuator to move the first support and the second support simultaneously such that a distance between the first support and the second support is maintained.

9. The stocking assistant robot of claim 4, further comprising
   a scanner configured to scan an item to be placed on the second support.

10. The stocking assistant robot of claim 9, wherein the scanner is a barcode reader.

11. A stocking assistant robot comprising:
    a base plate;
    one or more wheels coupled to the base plate;
    one or more electric motors coupled to the one or more wheels; and
    a controller comprising:
       one or more processors;
       one or more memory modules; and
       machine readable instructions stored in the one or more memory modules that, when executed by the one or more processors, cause the controller to:

receive identification information about a plurality of items from a scanner;

store an order of scanning the plurality of items based on the received identification information;

determine locations related to the plurality of items based on the identification information;

determine a driving route based on the locations and the order of scanning the plurality of items; and operate the one or more electric motors based on the driving route, wherein the driving route starts with a location of an item scanned last among the plurality of items and ends with a location of an item scanned first among the plurality of items.

12. The stocking assistant robot of claim 11, further comprising:

a first support coupled to the base plate; and a second support coupled to the base plate.

13. The stocking assistant robot of claim 12, wherein the first support is configured to move perpendicular to the base plate and the second support is configured to move perpendicular to the base plate.

14. The stocking assistant robot of claim 12, wherein the machine readable instructions stored in the one or more memory modules, when executed by the one or more processors, cause the controller to:

determine whether the stocking assistant robot arrives at one of the locations; and adjust heights of the first support and the second support in response to determination that the stocking assistant robot arrived at one of the locations.

15. The stocking assistant robot of claim 12, wherein the first support includes a scissor lift element.

16. The stocking assistant robot of claim 12, further comprising an arm configured to hold an item to be placed on the second support.

* * * * *